United States Patent
Willard et al.

(10) Patent No.: US 8,348,347 B2
(45) Date of Patent: Jan. 8, 2013

(54) FOLDING VEHICLE HEAD RESTRAINT ASSEMBLY

(75) Inventors: Scott A. Willard, Rochester, MI (US); Arjun Yetukuri, Rochester Hills, MI (US); Eric Veine, Wixom, MI (US); Sai Prasad Jammalamadaka, Novi, MI (US); Paul Castellani, Sterling Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 132 days.

(21) Appl. No.: 12/958,967

(22) Filed: Dec. 2, 2010

(65) Prior Publication Data
US 2011/0095592 A1    Apr. 28, 2011

Related U.S. Application Data

(63) Continuation-in-part of application No. 12/436,336, filed on May 6, 2009, now abandoned.

(51) Int. Cl.
*B60R 21/055* (2006.01)
(52) U.S. Cl. ........................... 297/408
(58) Field of Classification Search .......... 297/408
See application file for complete search history.

(56) References Cited

U.S. PATENT DOCUMENTS

| | | | |
|---|---|---|---|
| 3,695,700 A | 10/1972 | Flach | |
| 4,265,482 A | 5/1981 | Nishimura et al. | |
| 4,678,232 A | 7/1987 | Ishida et al. | |
| 4,834,456 A | 5/1989 | Barros et al. | |
| 4,856,848 A | 8/1989 | O'Sullivan et al. | |
| 5,006,771 A | 4/1991 | Ogasawara | |
| 5,145,233 A | 9/1992 | Nagashima | |
| 5,669,668 A | 9/1997 | Leuchtmann | |
| 6,024,405 A | 2/2000 | MacAndrew et al. | |
| 6,074,011 A | 6/2000 | Ptak et al. | |
| 6,471,296 B2 | 10/2002 | Lance | |
| 6,499,805 B1 | 12/2002 | Watadani | |

(Continued)

FOREIGN PATENT DOCUMENTS

DE    10 2008 003 649 A1    9/2008

(Continued)

OTHER PUBLICATIONS

Office Action mailed Sep. 2, 2010 in corresponding U.S. Appl. No. 12/436,336, filed May 6, 2009, 21 pages.

(Continued)

*Primary Examiner* — Rodney B White
(74) *Attorney, Agent, or Firm* — Brooks Kushman P.C.

(57) ABSTRACT

A vehicle head restraint assembly is provided with a cross member. A head restraint is supported by the cross member. A fixed locking member is mounted within the head restraint. A latch is moveably mounted on the cross member at a first latch position and at a second latch position. An actuator is mounted within the head restraint to move the latch between the first latch position and the second latch position. The head restraint is pivotable when the latch is in the second latch position. Another vehicle head restraint assembly is provided with a lateral support rod and a head restraint pivotally mounted thereon. A locking member is pivotally mounted within the head restraint. A latch is mounted on the support rod. An actuator disengages the locking member from the latch. A biasing member pivots the head restraint upon disengagement of the latch and the locking member.

20 Claims, 10 Drawing Sheets

U.S. PATENT DOCUMENTS

| | | |
|---|---|---|
| 6,612,653 B2 | 9/2003 | Takata |
| 6,860,564 B2 | 3/2005 | Reed et al. |
| 6,880,890 B1 | 4/2005 | DeBrabant |
| 6,899,395 B2 | 5/2005 | Yetukuri et al. |
| 6,935,696 B2 | 8/2005 | Gauthier et al. |
| 6,983,995 B1 | 1/2006 | Veine et al. |
| 7,073,863 B1 | 7/2006 | Low et al. |
| 7,267,407 B1 | 9/2007 | Demick et al. |
| 7,322,646 B2 | 1/2008 | Jammalamadaka et al. |
| 7,325,877 B2 | 2/2008 | Brockman et al. |
| 7,341,312 B2 | 3/2008 | Gauthier et al. |
| 7,427,108 B2 | 9/2008 | Hermansson et al. |
| 7,431,400 B2 | 10/2008 | Brawner |
| 7,562,936 B1 | 7/2009 | Veine et al. |
| 7,578,559 B2 | 8/2009 | Yamane et al. |
| 7,631,932 B2 | 12/2009 | Hoffmann |
| 7,669,932 B1 | 3/2010 | Gronninger et al. |
| 7,681,955 B2 | 3/2010 | Seo |
| 7,717,517 B2 | 5/2010 | Yamane et al. |
| 7,740,319 B2 | 6/2010 | Furukawa et al. |
| 7,758,126 B2 | 7/2010 | Haase |
| 7,866,754 B2 * | 1/2011 | Furukawa et al. ........ 297/408 X |
| 7,988,234 B2 * | 8/2011 | Kim et al. ..................... 297/408 |
| 8,066,330 B2 * | 11/2011 | Keller et al. ................. 297/408 |
| 8,083,291 B2 * | 12/2011 | Yoshida ....................... 297/408 |
| 8,104,836 B2 * | 1/2012 | Little ........................... 297/408 |
| 8,146,998 B2 * | 4/2012 | Jammalamadaka et al. .. 297/408 |
| 8,226,170 B2 * | 7/2012 | Lutzka et al. ................ 297/408 |
| 8,231,177 B2 * | 7/2012 | Jammalamadaka et al. .. 297/408 |
| 2005/0088027 A1 | 4/2005 | Yetukuri et al. |
| 2006/0061187 A1 | 3/2006 | Gauthier et al. |
| 2007/0114810 A1 | 5/2007 | Yetukuri et al. |
| 2007/0132300 A1 | 6/2007 | Toba |
| 2007/0170766 A1 | 7/2007 | Brawner |
| 2007/0236070 A1 | 10/2007 | Brockman |
| 2007/0284929 A1 | 12/2007 | Keller et al. |
| 2008/0036263 A1 | 2/2008 | Little |
| 2008/0100118 A1 | 5/2008 | Young et al. |
| 2008/0203801 A1 | 8/2008 | Jammalamadaka et al. |
| 2008/0277989 A1 | 11/2008 | Yamane et al. |
| 2009/0021068 A1 | 1/2009 | Yamane et al. |
| 2009/0058162 A1 | 3/2009 | Boes et al. |
| 2009/0146479 A1 | 6/2009 | Boes et al. |
| 2009/0152924 A1 | 6/2009 | Kim et al. |
| 2010/0019559 A1 | 1/2010 | Smith |
| 2010/0133889 A1 | 6/2010 | Lutzka et al. |
| 2010/0219670 A1 * | 9/2010 | Jammalamadaka et al. .. 297/408 |

FOREIGN PATENT DOCUMENTS

| | | |
|---|---|---|
| EP | 0 352 234 A1 | 1/1990 |
| WO | 2007 112568 A1 | 10/2007 |

OTHER PUBLICATIONS

German Office Action dated Dec. 17, 2010 in corresponding German Appn. No. 10 2010 001 927.5-16, 2 pages.

* cited by examiner

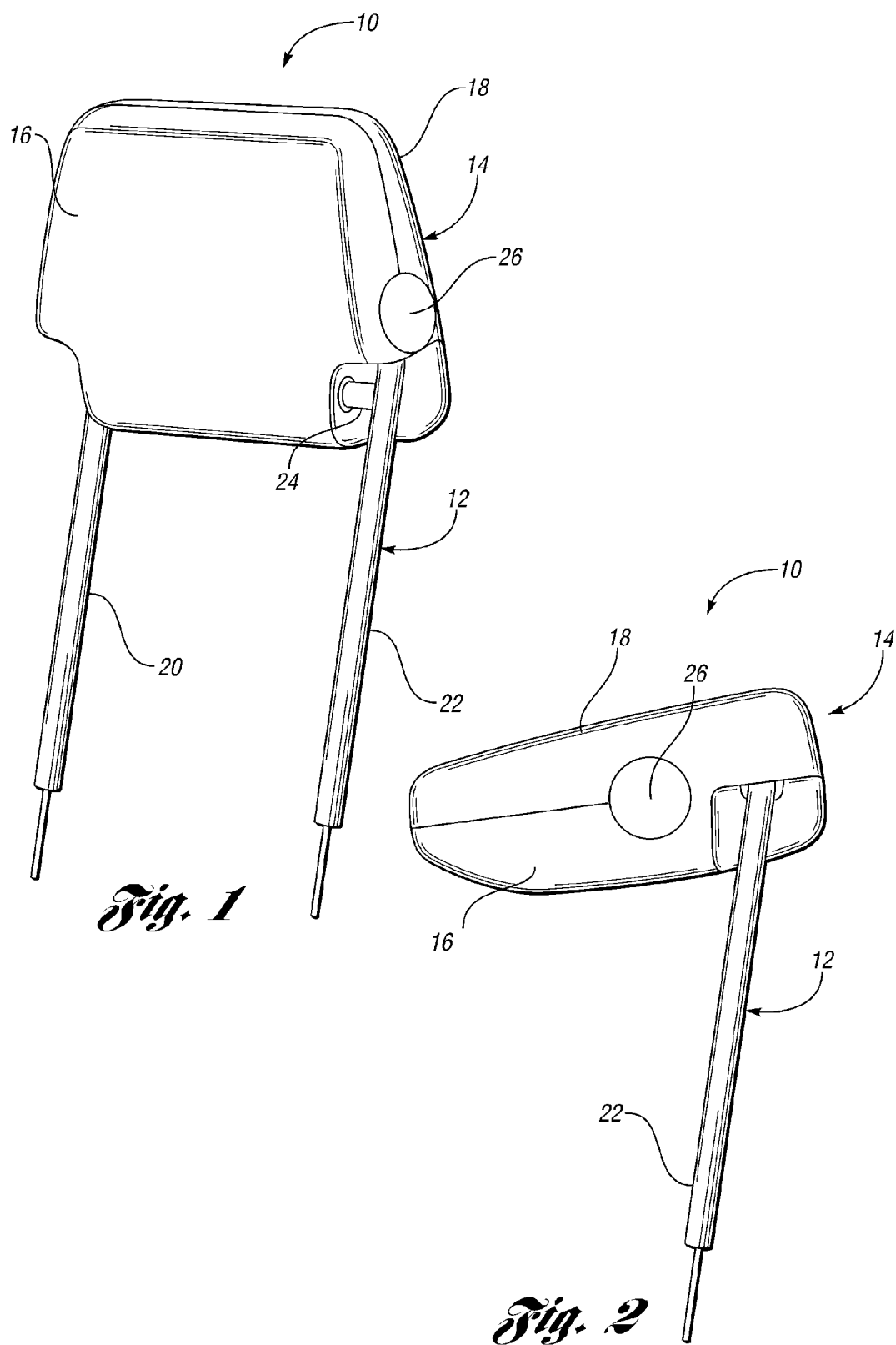

FOLDING VEHICLE HEAD RESTRAINT ASSEMBLY

CROSS-REFERENCE TO RELATED APPLICATIONS

This application is a continuation-in-part of U.S. application Ser. No. 12/436,336, filed May 6, 2009, the disclosure of which is incorporated in its entirety by reference herein.

BACKGROUND

1. Technical Field

Multiple embodiments relate to folding head restraint assemblies for vehicles.

2. Background Art

Vehicle seats are often provided with moveable head restraints, which can move to accommodate a head of an occupant and/or can move to various stowed positions to decrease the size of the vehicle seats. One example of a vehicle seat having a movable head restraint is disclosed in U.S. Pat. No. 6,899,395 B2, which issued on May 31, 2005 to Yetukuri et al.

BRIEF DESCRIPTION OF THE DRAWINGS

FIG. 1 is a perspective view showing an embodiment of a head restraint assembly in an upright position;

FIG. 2 is a perspective view of the head restraint assembly of FIG. 1 in a folded position;

DETAILED DESCRIPTION OF THE DRAWINGS

Figure 3:
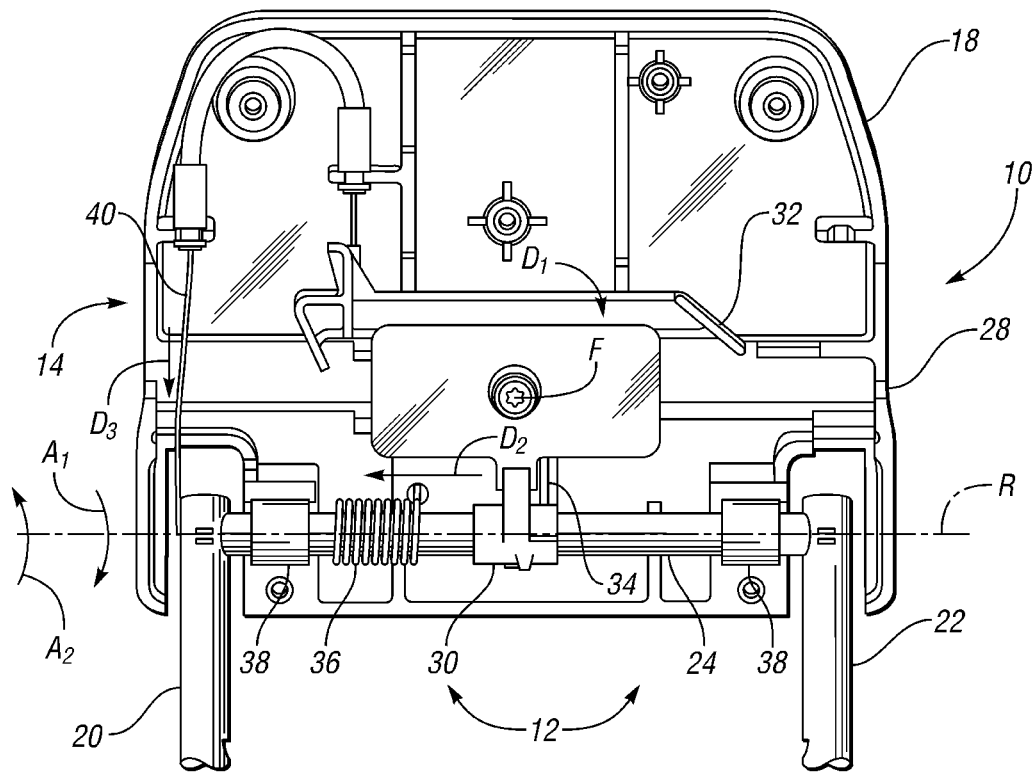
FIG. 3 is an elevation view of an embodiment of an interior of the head restraint assembly of FIG. 1 in a locked position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference to FIGS. 1-2, a folding head restraint assembly is illustrated and generally referenced by numeral 10. The folding head restraint assembly 10 may be mounted on a vehicle seat for use in a vehicle, such as an automobile, a boat or an airplane. The vehicle seat may include a seat bottom secured to a floor of an associated vehicle for seating an occupant upon the seat bottom. A seat back may extend from the seat bottom and be secured relative to the seat bottom for supporting a back of the occupant against the seat back. In at least one embodiment, the seat back spans across a second row of seating of the vehicle to provide support for multiple occupants. In at least one embodiment, the seat back pivots relative to a seat bottom to permit access behind the seat back and/or to permit an occupant to select a comfortable riding position while sitting in the vehicle seat.

The folding head restraint assembly 10 disclosed herein can be implemented on a variety of seat backs to fold out of view of the driver. The folding head restraint assembly 10 can receive multiple inputs while maintaining configuration in order to be utilized in various vehicles. Additionally, the folding head restraint assembly 10 can be implemented to fold as the seat back is folded and/or to remain folded while the seat back is unfolded. The head restraint assembly 10 can be implemented in a variety of vehicles that may have various head restraint assembly requirements, which provides cost savings.

It is known that head restraint assemblies are more readily being included in and/or on second rows and third rows of vehicle seats. These head restraint assemblies in second and third rows may obstruct view for a driver. Additionally, head restraint assemblies must often be designed specifically for applications within specific vehicles. The folding head restraint assembly 10 disclosed herein can be implemented on a variety of seat backs and/or fold out of view of the driver.

In FIG. 1, the head restraint assembly 10 is illustrated in an upright position to support the head of the occupant. In FIG. 2, the head restraint assembly 10 is illustrated in a folded position so that the driver's rear view is not impaired when the head restraint assembly 10 is not in use by another occupant. As illustrated in FIGS. 1-2, the head restraint assembly 10 includes a mounting subassembly 12 and a head restraint 14. The head restraint 14 includes shell sections 16, 18. The mounting subassembly 12 is attached to the head restraint 14 and allows movement from the first folded position to the upright position and vice versa.

The mounting subassembly 12 includes a first support post 20, a second support post 22, and a cross member 24. The first support post 20 and the second support post 22 are each attached to the cross member 24. In a variation of the present embodiment, the support posts 20, 22 are each cylindrically shaped. In a further refinement, one or both of the support posts 20, 22 is substantially hollow or includes hollow sections. In another refinement, the support posts 20, 22 are adapted to be positioned in receptacles in a vehicle seat back. In such refinements, the height of the head restraint 14 is often adjustable. Similarly, in another variation of the present embodiment, the cross member 24 is also cylindrically shaped. In a further refinement, the cross member 24 is substantially hollow or includes hollow sections. In other variations, the support posts 20, 22 and the cross member 24 are substantially solid (i.e., non-hollow) or include solid sections. In still other variations, first support post 20 and second support post 22 are bent (e.g., doglegged). In yet another embodiment, the mounting subassembly 12 includes only the cross member 24 that is mounted to a seat back or to the vehicle, as discussed below in reference to FIGS. 8-9.

It should be appreciated, that is some variations, the head restraint assembly 10 is designed to fold towards the front of a vehicle, as illustrated in FIG. 2. In other variations, the head restraint assembly 10 is designed to fold towards the rear of the vehicle. Since the head restraint assembly 10 can fold toward the front of the vehicle or the rear of the vehicle with minimal modification, the head restraint assembly 10 can be implemented in a variety of vehicles that may have various head restraint assembly requirements.

As illustrated, the head restraint 14 may have a mechanical actuator 26 that extends beyond the first shell 16 and the second shell 18. In at least one embodiment, the mechanical actuator 26 is flush with an outer surface of the head restraint 16, which may be an outer surface of the cushioning and/or trim. The mechanical actuator 26 is actuated to fold the head restraint 14 from the upright position shown in FIG. 1 to the folded position shown in FIG. 2, as discussed further below. In at least one embodiment, the mechanical actuator 26 includes a push button 26 to allow an occupant to press thereon to fold the head restraint 16. In an alternate embodiment, the mechanical actuator may in include a sliding button to allow an occupant to slide the button in order to fold the head restraint 16. As illustrated in FIG. 1-2, the push button may be located along a lateral side of the head restraint 14.

Figure 4:
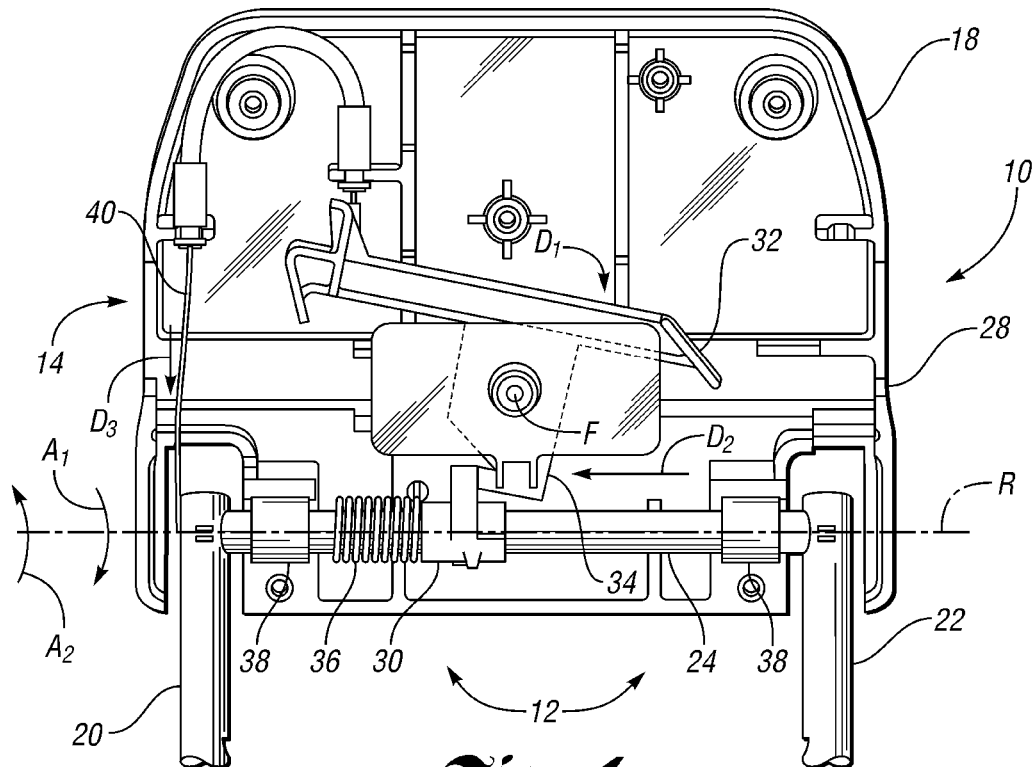
FIG. 4 is another elevation view of an embodiment of the interior of the head restraint assembly of FIG. 3 in a released position.

With reference now to FIGS. 3-4, the head restraint assembly 10 is illustrated with the first shell 16 removed for illustrative purposes. The head restraint assembly 10 is depicted in the upright position. From the upright position, the head restraint 14 can pivot about the axis of rotation R in a first direction indicated by the arrow $A_1$ and in a second direction indicated by the arrow $A_2$ to a forward folded position or a rear folded position. One non-limiting example of the rotation between the upright position and the folded position is illustrated in FIGS. 1-2. The head restraint 14 can pivot between any suitable use position and folded position.

As illustrated in FIG. 3, a fixed locking member 28 retains a latch 30 to maintain the head restraint 14 in the upright position. In one embodiment, the fixed locking member 28 is a lock plate. In another embodiment, the fixed locking member 28 is a reaction surface, as discussed further below. In a further embodiment, the fixed locking member 28 is a flat surface on the shell 18, also discussed further below. In the illustrated embodiment, the locking member 28 is affixed to the head restraint 14 so that the locking member 28 does not pivot relative to the shell 18. The latch 30 is moveably mounted to the cross member 24 such that the latch 30 can traverse laterally along the cross member 24 to unlock the latch 30 from engagement with the locking member 28. When the latch 30 is disengaged from the locking member 28, as illustrated in FIG. 4, the head restraint 14 can pivot about the axis of rotation R in a first direction indicated by the arrow $A_1$ and in a second direction indicated by the arrow $A_2$. Since the head restraint 14 can pivot in the first direction $A_1$ or the second direction $A_2$, the same head restraint 14 may be employed within various vehicles that may require forward folding head restraints or rear folding head restraints.

The head restraint assembly 10 includes an actuator 32 to move the latch 30 from engagement with the locking member 28. As illustrated in FIG. 3, the actuator 32 is in a design position. The actuator 32 can pivot about a fixed point F in a first direction $D_1$ to the actuated position, illustrated in FIG. 4. In one embodiment, the actuator 32 may be biased relative to the latch 30 to maintain contact therebetween. In another embodiment, the actuator 32 is biased in a direction opposite to $D_1$, so that when the actuator 32 is in the actuated position, the actuator 32 returns to the design position. In at least one embodiment, the actuator 32 has a tab portion 34 to abut the latch 30. The tab portion 34 may be hinged so that the tab portion 34 abuts the latch 30 while the actuator 32 pivots.

When the actuator 32 pivots about the fixed point F from the design position illustrated in FIG. 3 to the actuated position illustrated in FIG. 4, the actuator 32 engages with the latch 30 to slide the latch 30 laterally in a second direction $D_2$, as illustrated in FIG. 4. When the latch 30 has been moved laterally in the second direction $D_2$, the latch 30 is disengaged from the locking member 28. Once the latch 30 is disengaged from the locking member 28, the head restraint 14 can pivot about the axis of rotation R in a first direction indicated by the arrow $A_1$ and in a second direction indicated by the arrow $A_2$.

As illustrated in FIGS. 3-4, the head restraint assembly 10 has a biasing member 36 mounted on the cross member 24 to pivot the head restraint 14 about the axis of rotation R when the latch 30 is released from the locking member 28. The biasing member 36 is adapted to be connected to the rear housing 18 of the head restraint 14 at a first distal end and to the cross member 24 at a second distal end to bias the head restraint 14 in either the first direction indicated by the arrow $A_1$ or in the second direction indicated by the arrow $A_2$. In one embodiment, the biasing member 36 is a compression spring. In another embodiment, the biasing member 36 is a torsion spring. Of course, any suitable biasing member 36 is contemplated within the scope of the disclosed embodiments.

The head restraint assembly 10 may include one or more bushings 38 mounted between the head restraint 14 and the cross member 24. The cross member 24 may have a section provided through the one or more bushings 38 thereby allowing rotation of one or more bushings 38 about cross member 24. The bushings 38 may be attached to the rear shell 18 and/or the front shell 16. In some variations, bushings 38 are split bushings. In at least one embodiment, the bushings 38 are oil-impregnated bushings. Of course, any suitable bushings 38 and any suitable amount of bushings 38 may by utilized.

In at least one embodiment, illustrated in FIGS. 3-4, the actuator 32 is pivoted from the design position to the actuated position with a cable 40. The cable 40 is displaced in a direction $D_3$ to rotate the actuator 32. In one embodiment, the cable 40 is displaced with a pull strap. A user can pull the pull strap along the direction $D_3$, which displaces the cable 40 and rotates the actuator 32. In another embodiment, the cable 40 is displaced by a switch or button provided on the vehicle seat.

In at least one embodiment, the cable 40 is provided within the mounting subassembly 12 through one or more of the first support post 20, the second support post 22 and the cross member 24. Of course, any suitable manner of displacing the cable 40 is contemplated within the scope of the disclosed embodiments.

Figure 5:
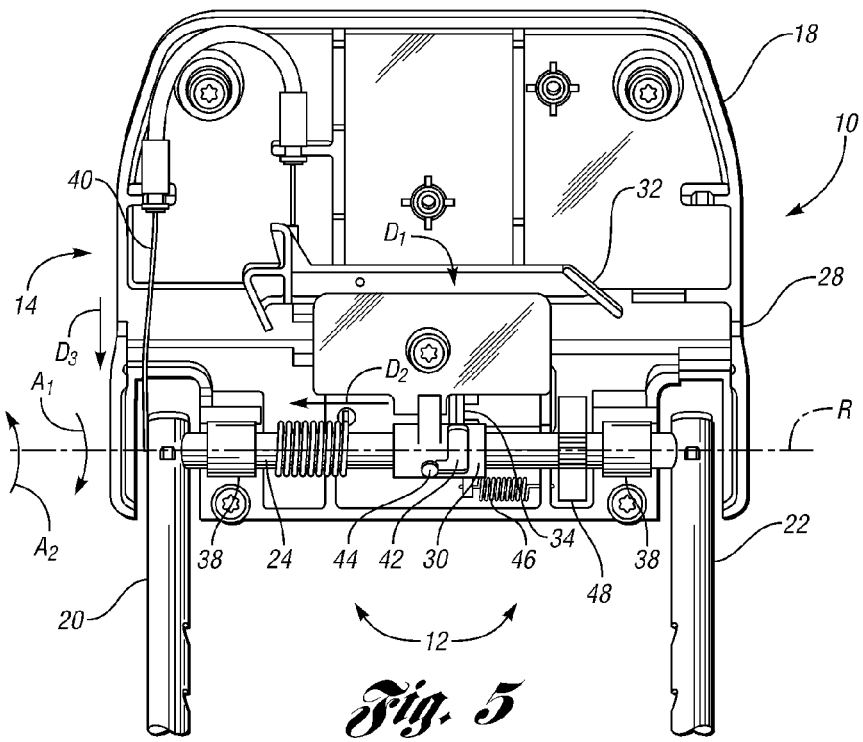
FIG. 5 is a schematic illustration of another embodiment of an interior of the head restraint assembly of FIG. 1 in a locked position.

With reference now to FIG. 5, another embodiment of the head restraint assembly 10 is illustrated with the first shell 16 removed for illustrative purposes. The latch 30 may have a release slot 42 formed therein to cooperate with a pin 44 provided on the cross member 24. The release slot 42 may have a generally L-shape so that as the latch 30 moves along the cross member 24, the release slot 42 slides over the pin 44 in the direction indicated by $D_2$ as the latch 30 is moved by the actuator 32 in the direction $D_2$. When the latch 30 is disengaged from the locking member 28, the release slot 42 allows the head restraint 14 to pivot about the axis of rotation R in the first direction indicated by the arrow $A_1$ as the pin 44 follows the generally L-shape of the release slot 42. In at least one embodiment, a biasing member 46 is mounted to the head restraint 14 and the latch 30 to bias the latch 30 in the direction A1. When the actuator 32 displaces the latch 30 in direction $D_2$, the release slot 42 passes over the pin 44 in the first direction $D_2$. Since the release slot 42 is generally L-shaped, the release slot 42 then passes over the pin 44 in the second direction $A_1$, while the head restraint 14 pivots in the second direction $A_1$ about the axis of rotation R. Of course, the directions of travel for the latch 30 and the head restraint 14 relative to the cross member 24 may be reversed or alternated within the scope of the disclosed embodiments.

A damper mechanism 48 may be mounted within the head restraint 14 to damp the movement of the head restraint 14 when pivoting from the upright position to the folded position thereby allowing such movement to proceed smoothly. As illustrated, the biasing member 46 may be connected to the damper mechanism 48. The damping mechanism 48 may include a pinion gear, which may be attached to the cross member 24 and a damper, which may be attached to the head restraint 14. Various damper mechanisms 48 may be provided having various dampening characteristics in order to accommodate different head restraint assemblies 14.

Figure 6:
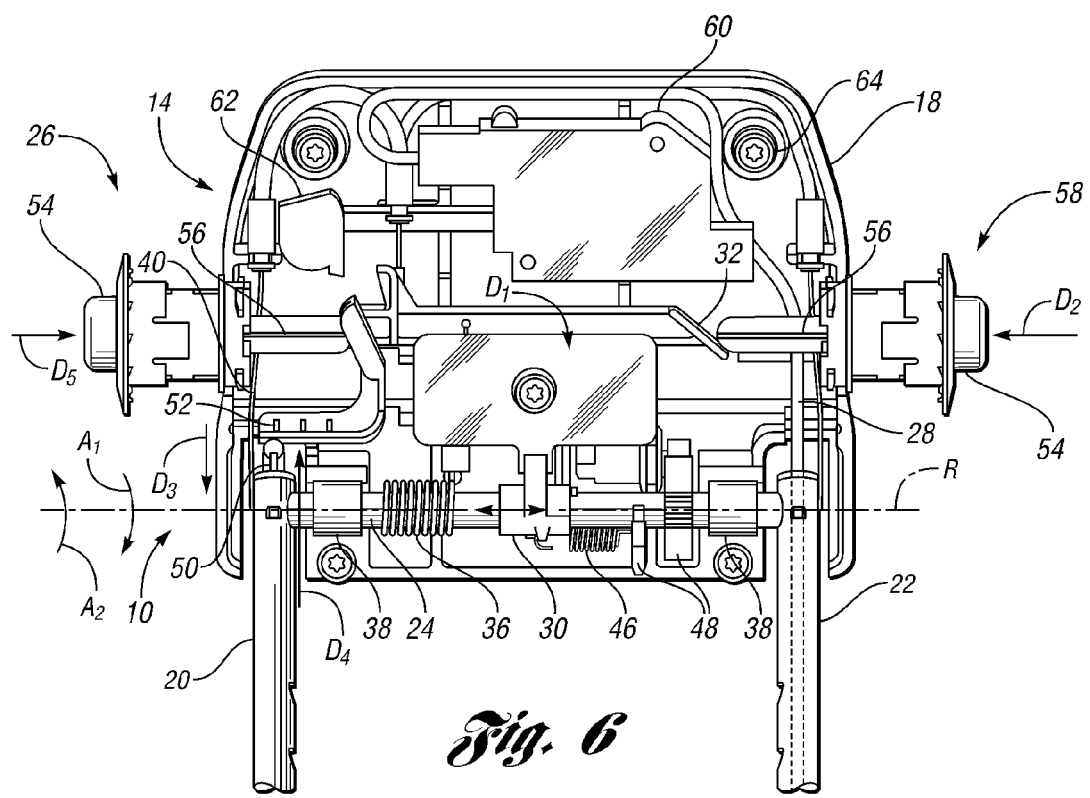
FIG. 6 is a schematic illustration of another embodiment of an interior of the head restraint assembly of FIG. 1 in a locked position.

With reference now to FIG. 6, yet another embodiment of the head restraint assembly 10 is illustrated with the first shell 16 removed for illustrative purposes. The head restraint assembly 10 is depicted with several mechanisms to initiate movement of the actuator 32 to move the latch 30 from an engaged position to a disengaged position. In one embodiment, a push rod 50 moves in a direction $D_4$ to cause pivoting of the actuator 32 in the direction $D_1$, which thereby displaces the latch 30 in the direction $D_2$. As illustrated, the actuator 32 and the push rod 50 may be connected together via an armature 52 so that displacement of the push rod 50 in the direction $D_4$ correspondingly moves the armature 52 to pivot the actuator 32.

In another embodiment, the mechanical actuator 26, illustrated in FIGS. 1-2 is provided to initiate movement of the actuator 32. The mechanical actuator 26 may be provided on either side of the head restraint assembly 10. In at least one embodiment illustrated in FIG. 6, the first mechanical actuator is a push button actuator 26. The push button actuator 26 has a push button 54 that may be provided externally to the housing 18. The push button 54 may be depressed by a user in a direction $D_5$. The push button 54 is connected to a translating member 56 that is provided to translate when moved by the push button 56. The translating member 56 moves in the direction $D_5$ to move the actuator 32 to pivot the latch 30. In at least one embodiment, the mechanical actuator 26 is employed with the second mechanical actuator 58 so that the user could mechanically actuate the folding head restraint assembly 10 with the first mechanical actuator 32 or the second mechanical actuator 58.

In the depicted embodiment, the actuator 32 can be pivoted with a motor 60. When activated, the motor 60 moves an armature 62 in the direction $D_5$ in order to pivot the actuator 32 in the direction $D_1$ thereby moving the latch 30 from engagement with the locking member 28. In one embodiment, a user activates the motor 60 via a control signal carried thereto via wiring 64. In at least one refinement, a wireless receiver is used to generate this control signal.

In at least one embodiment, the wiring 64 is provided within the hollow support 22, which provides a clean exit point without turns and without pinching and/or rubbing of the wiring and/or cable against sharp edges. Any suitable wiring 64 may be provided within the hollow support 22.

Figure 7:
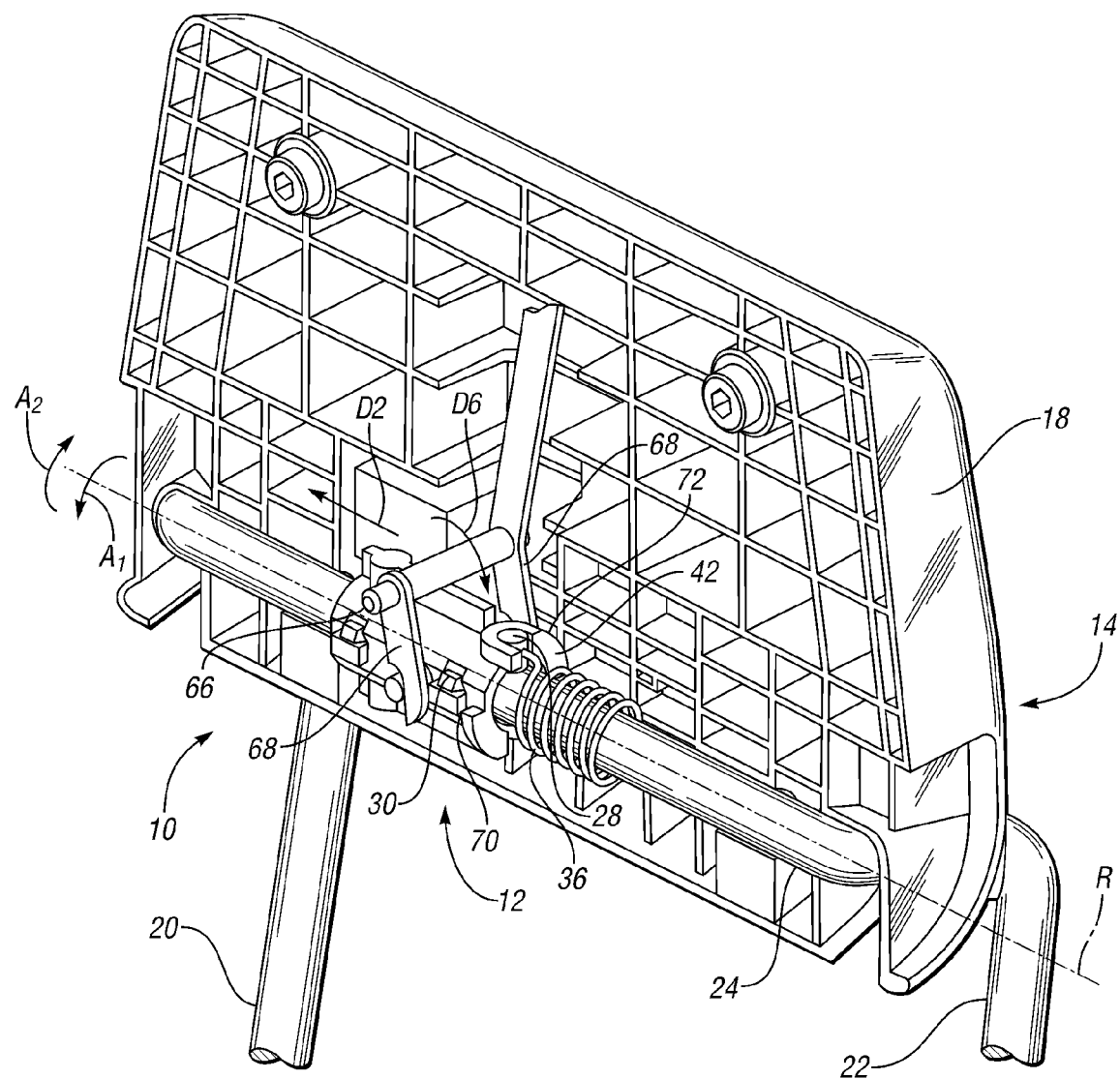
FIG. 7 is a schematic illustration of another embodiment of an interior of the head restraint assembly of FIG. 1 in a locked position.

With reference now to FIG. 7, yet another embodiment of the head restraint assembly 10 is illustrated with the first shell 16 removed for illustrative purposes. As illustrated, the fixed locking member 28 is a pin. The pin 28 is mounted on the cross member 24 so that the pin 28 does not move relative to the cross member 24. In at least one embodiment, the pin 28 is press-fit into two extruded apertures formed in the cross member 24. Of course, any suitable pin 28 is contemplated within the scope of the disclosed embodiments.

As illustrated, the pin 28 maintains contact with the latch 30 to lock the head restraint 14 in the upright position. The latch 30 is moveably mounted on the cross member 24 and may have a slot 42 formed therein to receive the pin 28. Movement of the latch 30 in the direction $D_2$ disengages the slot 42 of the latch 30 from the pin 28 so that the head restraint 14 can move about the axis of rotation R in either the first direction indicated by the arrow $A_1$ or in the second direction indicated by the arrow $A_2$ to the folded position. The first direction indicated by the arrow $A_1$ may be towards either the front of the vehicle or the rear of the vehicle and the second direction would correspondingly be towards the rear of the vehicle or the front of the vehicle. As illustrated, the slot 42 may be open-ended to allow for rotation of the latch 30 when the slot 42 is disengaged from the pin 28.

In the depicted embodiment, the head restraint assembly 10 has a biasing member 36 mounted on the cross member 24 to pivot the head restraint 14 about the axis of rotation R when the latch 30 is moved from contact with the pin 28. The biasing member 36 is adapted to be connected to the rear housing 18 of the head restraint 14 at a first distal end and to the pin 28 at a second distal end to bias the head restraint 14 in either the first direction indicated by the arrow $A_1$ or in the second direction indicated by the arrow $A_2$. In another embodiment, the biasing member 36 is connected to the rear housing 18 at the first distal end and to the cross member 24 at the second distal end. In at least one embodiment, the biasing member 36 is a compression spring. In another embodiment, the biasing member 36 is a torsion spring. Of course, any suitable biasing member 36 is contemplated within the scope of the disclosed embodiments.

In at least one embodiment, the latch 30 is moved by a link 66, which can be connected to a suitable actuator. In one embodiment, the link 66 is connected to a cable to displace the link 66. Of course, any suitable actuator for the link 66 is contemplated within the scope of the disclosed embodiments. The link 66 engages with the latch 30 to slide the latch 30 laterally in the direction $D_2$. The link 66 is displaced in a suitable direction to cause movement of latch 30. In at least one embodiment, the link 66 can be displaced by the actuator so that a portion of the link 66 is rotated in a direction indicated by an arrow pointing in direction $D_6$ so that the arms 68 move in the direction $D_2$ and consequently displace the latch 30. When the latch 30 is displaced in the direction $D_2$, the slot 42 of the latch 30 is disengaged from the pin 28 so that the head restraint 14 moves from the upright position illustrated to the folded position.

The latch 30 may have a first member 70 and a second member 72 that collectively form the latch 30. In at least one embodiment, the first member 70 and the second member 72 are identical so that the first member 70 and the second member 72 can be cost effectively formed and mounted to the cross member 24. The first member 70 and the second member 72 may be snap-fit onto the cross member 24 in a known manner. Of course, any suitable latch 30 is contemplated within the scope of the disclosed embodiments.

Figure 8:
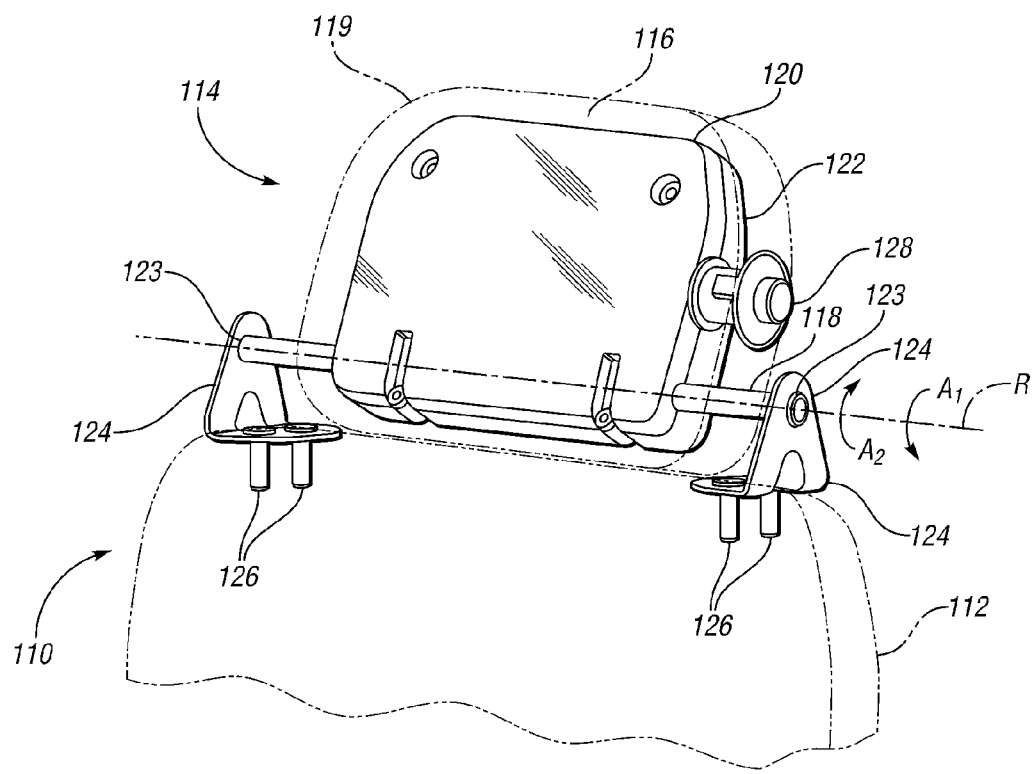
FIG. 8 is a front perspective view of an embodiment of a vehicle seat having a folding head restraint assembly in a use position.
Figure 9:
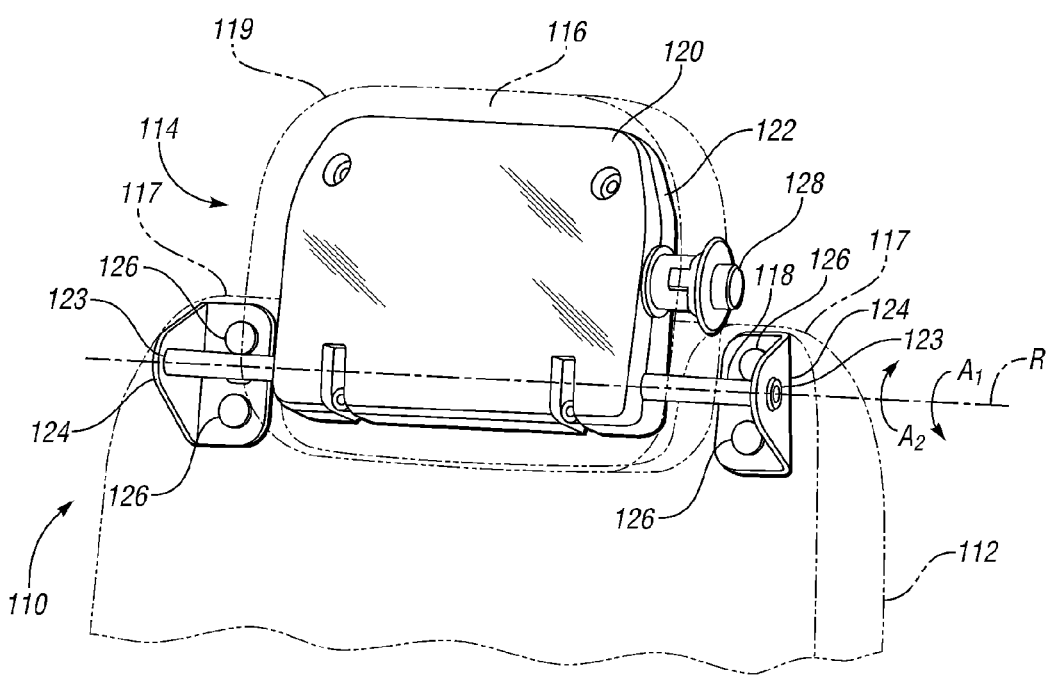
FIG. 9 is a front perspective view another embodiment of a vehicle seat having a folding head restraint assembly of FIG. 8.

Referring to FIGS. 8-9, a vehicle seat is illustrated and referenced generally by numeral 110 for use in a vehicle. A seat back 112 is secured relative to the seat bottom for supporting a back of the occupant against the seat back 112. In at least one embodiment, the seat back 112 spans across a second row of seating of the vehicle to provide support for multiple occupants. In at least one embodiment, the seat back 112 pivots relative to the seat bottom.

In the depicted embodiments, the vehicle seat 110 includes a folding head restraint assembly 114. The folding head restraint assembly 114 disclosed herein can be implemented on a variety of seat backs 112 and/or fold out of view of the driver and can fold to alleviate interference between the vehicle head restraint assembly 114 and the convertible roof. The folding head restraint assembly 114 can receive multiple inputs while maintaining configuration in order to be utilized in various vehicles.

Figure 10:
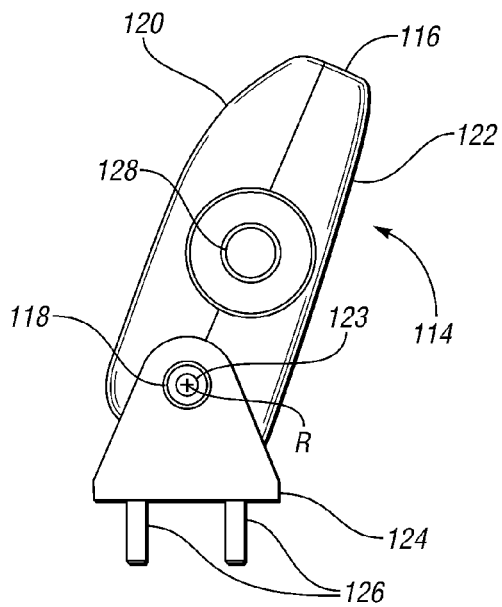
FIG. 10 is a side elevation view of the folding head restraint assembly of FIG. 8.
Figure 11:
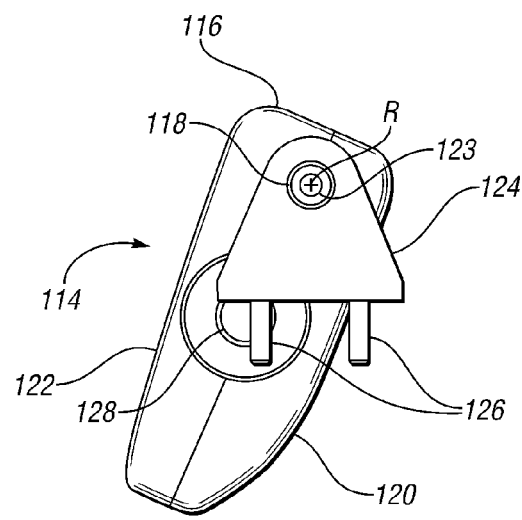
FIG. 11 is another side elevation view of the folding head restraint assembly of FIG. 10 illustrated in a stowed position.

As illustrated in FIG. 8-10, the folding head restraint assembly 114 has a head restraint 116 in a use position. The head restraint 116 may fold about an axis of rotation R in a first direction indicated by an arrow $A_1$ or in a second direction indicated by an arrow $A_2$. Of course, any suitable axis of rotation is contemplated within the scope of the disclosed embodiments. As illustrated in FIG. 11, the head restraint 116 is in a folded position. In the folded position, the head restraint 116 has rotated about the axis R in the direction indicated by arrow $A_1$ so that the head restraint 116 is stowed. The folding head restraint 116 may return to the use position by moving in the direction indicated by arrow $A_2$.

In one embodiment, illustrated in FIG. 9, the axis of rotation R is below an upper surface 117 of the seat back 12. Providing the axis of rotation R below the upper surface 117 creates a compact vehicle seat 110 when the head restraint assembly 114 is folded. Since the head restraint 116 does not extend beyond the upper surface 117 of the seat back 112, view over the vehicle seat 110 is enhanced compared to the prior art.

In at least one embodiment, illustrated in FIGS. 10-11, approximately one hundred-eighty degrees are between the use position and the folded position. In another embodiment, the head restraint 116 pivots at least ninety degrees between the use position and the folded position. In yet another embodiment, the head restraint 116 pivots at least sixty degrees between the use position and the folded position. Of course, the folding head restraint assembly 114 may have any range of motion between the use position and the folded position.

As illustrated in FIGS. 8-9, the folding head restraint assembly 114 is supported by the seat back 112. The head restraint assembly 114 can be separately mounted to the seat back 112 or can be integrated with the seat back 112 in any suitable manner while allowing the head restraint assembly 114 to fold between at least the use position and the folded position. In at least one embodiment, the head restraint assembly 110 is mounted to a rear shelf for a second row of seating of the vehicle interior instead of to the seat back 112. In another embodiment, the head restraint assembly 110 is mounted on a frame of the vehicle instead of to the seat back 112. The head restraint assembly 114 need not be directly mounted to the seat back 112 and may be mounted indirectly to the seat back 112 in any suitable manner, such as via a secondary frame or support. Any suitable folding mounting for the head restraint assembly 110 is contemplated within the scope of the disclosed embodiments.

In the depicted embodiment, the head restraint 116 is supported by a lateral support rod 118. The head restraint 116 may have cushioning and/or trim 119 mounted thereon, although for illustrative purposes the head restraint 116 is illustrated with cushioning and/or trim removed. Any suitable cushioning and/or trim 119 may be utilized. In the depicted embodiment, the head restraint 116 is formed out of a first housing 120 and a second housing 122. Although a first housing 120 and a second housing 122 are depicted, any suitable amount of housings 120, 122 is contemplated within the scope of the disclosed embodiments.

The head restraint 116 is mounted on the lateral support rod 118. The lateral support rod 118 is mounted to the seat back 112. Although the lateral support rod 118, as depicted, is mounted to the seat back 112, any suitable mounting surface for the lateral support rod 118 is contemplated. In one embodiment, the lateral support rod 118 is mounted to a vehicle shelf provided behind the seat back 112. In another embodiment, the lateral support rod 118 is mounted to a vehicle frame. The lateral support rod 118 may be constructed from a single metal tube or rod. In at least one embodiment, the lateral support rod 118 is hollow to receive wiring and/or cable therethrough, as discussed further below.

The lateral support rod 118 has terminal ends 123. In the embodiment illustrated in FIG. 9, the terminal ends 123 terminate within the seat back 112. As discussed further below, wiring and/or cable may be provided within a hollow lateral support rod 118, which permits pivoting of the wiring and/or cable and a clean exit point without turns and without pinching and/or rubbing of the wiring and/or cable against sharp edges. Additionally, the lateral support rod 118 may have any suitable length and need not extend beyond the head restraint 116, as illustrated. Furthermore, the lateral support rod 118 can be attached to support posts to mount the head restraint 116 within the vehicle. Of course, any suitable lateral support rod 118 is contemplated within the scope of the disclosed embodiments.

As depicted in FIGS. 8-9, the lateral support rod 118 is mounted to the seat back 112 with a pair of bracket members 124 and fasteners 126 provided through the bracket members 124. In at least one embodiment, the lateral support rod 118 is orbitally riveted to the bracket members 124 to allow the lateral support rod 118 to pivot about the axis of rotation R. Of course, the lateral support rod 118 can be pivotally mounted to the bracket members 124 in any suitable manner. The bracket member 124 can be employed to mount the head restraint assembly 114 within the vehicle at any angle. In one embodiment, illustrated in FIG. 8, the bracket members 124 are generally upright to mount the lateral support rod 118 to the seat back 112. In another embodiment, illustrated in FIG. 8, the bracket members 124 are approximately ninety degrees from the generally upright position illustrated in FIG. 8. Of course, any suitable orientation for the bracket members 124 is contemplated within the scope of the disclosed embodiments.

As depicted in FIG. 8, fasteners 126 are provided through the bracket members 124 to secure the lateral support rod 118 to the seat back 112. Although a pair of fasteners 126 secures each bracket member 124 to the seat back 112, any suitable amount of fasteners 126 is contemplated within the scope of the disclosed embodiments. Furthermore, fasteners 126 can be entirely eliminated and an adhesive or other type of joining may be employed.

The head restraint assembly 114 may include a first mechanical actuator 128 that extends beyond the first housing 120 and the second housing 122. In at least one embodiment, the first mechanical actuator 128 is flush with an outer surface of the head restraint 116, which may be an outer surface of the cushioning and/or trim 119. The first mechanical actuator 128 is actuated to fold the head restraint 116 about the axis of rotation R, as discussed further below. In at least one embodiment, the first mechanical actuator 128 includes a push button to allow an occupant to press thereon to fold the head restraint 116.

Figure 12:
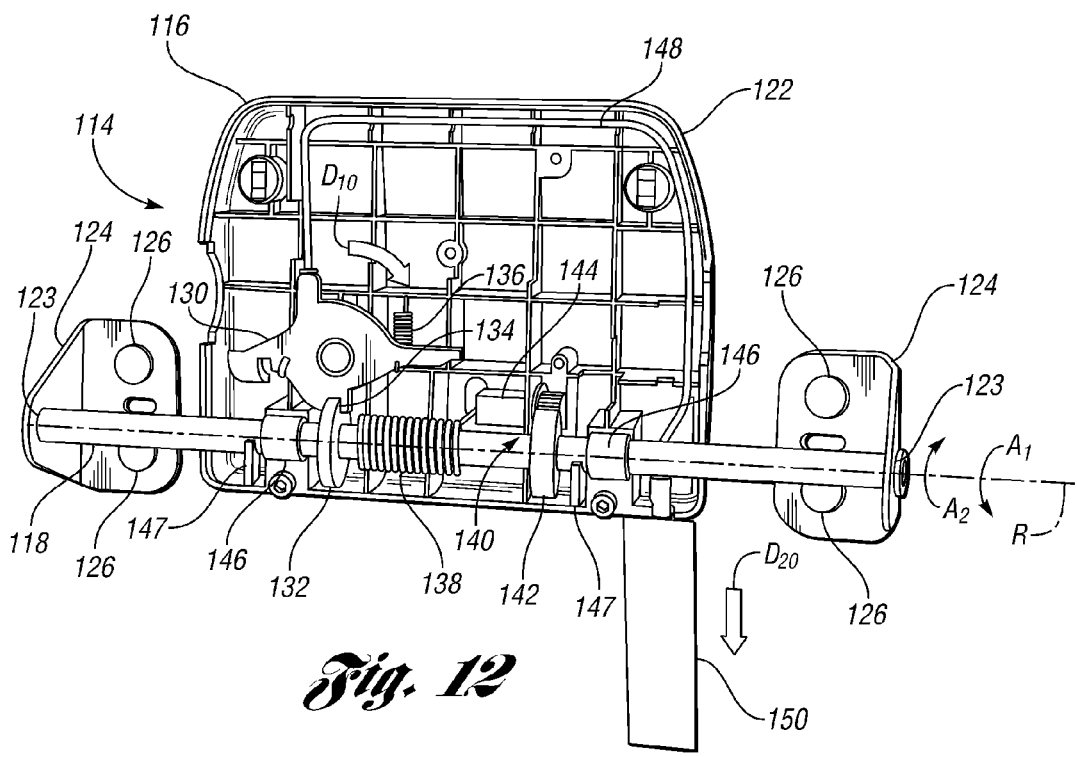
FIG. 12 is a front perspective view of an embodiment of the folding head restraint assembly of FIG. 9 with a portion removed.
Figure 13:
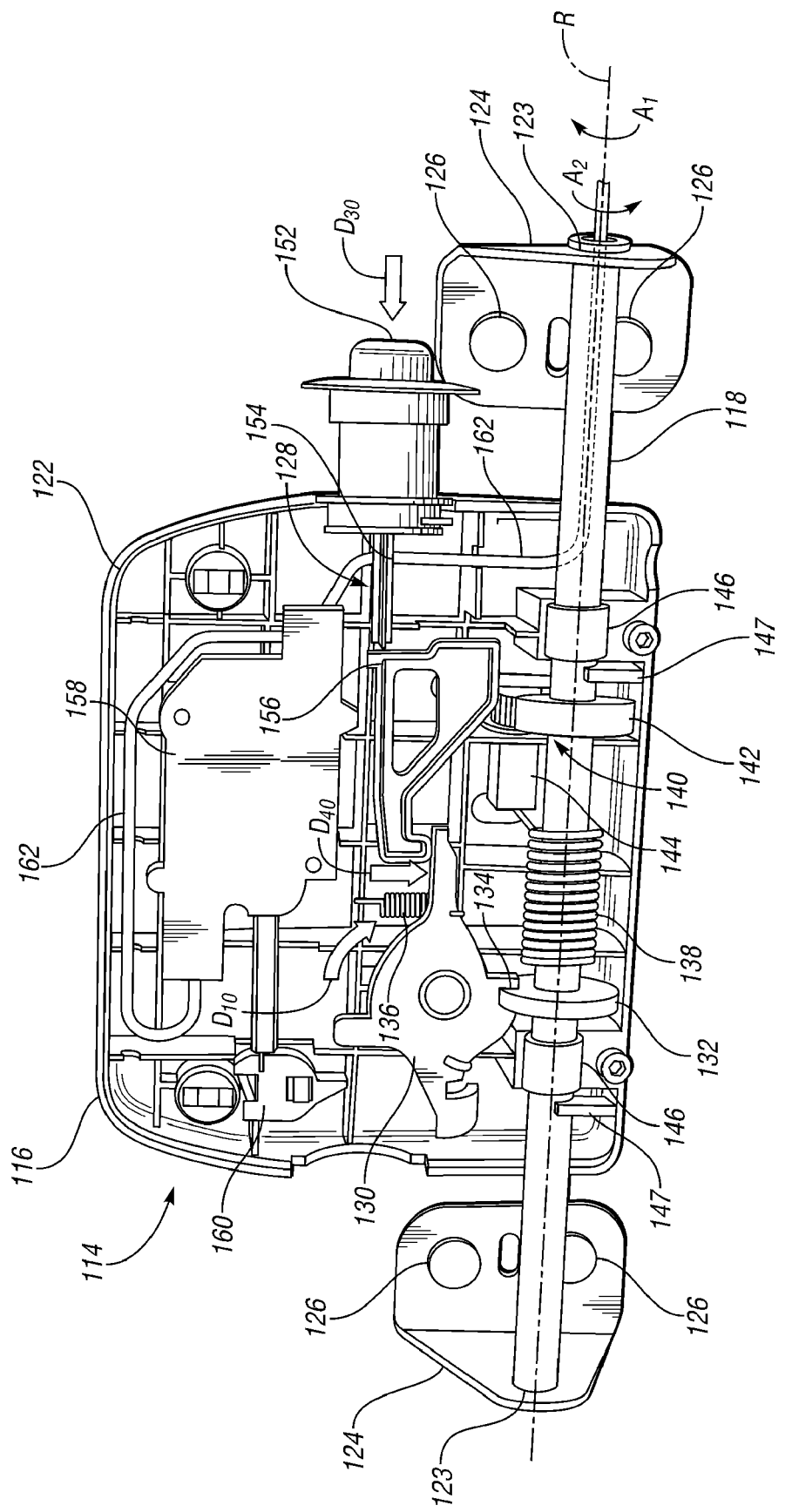
FIG. 13 is a front perspective view of another embodiment of the folding head restraint assembly of FIG. 9 with a portion removed.

With reference now to FIGS. 12-13, at least two embodiments of the head restraint assembly 114 are illustrated with the front housing 120 removed for illustrative purposes. The head restraint assembly 114 is depicted in the use position. From the use position, the head restraint 116 can pivot about the axis of rotation R in the first direction indicated by the arrow $A_1$ and in the second direction indicated by the arrow $A_2$ to the folded position. One non-limiting example of the rotation between the use position and the folded position is illustrated in FIGS. 10-11. The head restraint 116 can pivot between any suitable use position and folded position.

As illustrated in FIGS. 12-13, pivoting movement of a locking plate 130 along direction D10 is used to engage and disengage a latch 132 from the locking plate 130. When the locking plate 130 has the position illustrated, the locking plate 130 engages within a slot 134 of the latch 132 thereby preventing movement (i.e., pivoting) of the head restraint assembly 114 to the lateral support rod 118. When the locking plate 130 has been rotated along the direction $D_{10}$, the locking plate 130 is released because the locking plate 130 does not physically engage within the slot 134 of the latch 132 since the latch 132 would be able to pass by the locking plate 130. When the locking plate 130 and the latch 132 are not physically engaged, the head restraint assembly 114 is pivotable about the axis of rotation R in the first direction indicated by the arrow $A_1$ and in the second direction indicated by the arrow $A_2$ to the folded position.

In one embodiment, a locking plate biasing member 136 is provided to move locking plate 130 return the locking plate 130 to engagement with the latch 132. In one embodiment, the locking plate biasing member 136 is a spring. The locking plate 130 can automatically return to engagement with the latch 132 when the slot 134 and the locking plate 130 are in alignment.

In the depicted embodiment, the head restraint assembly 114 has a biasing member 138 mounted on the lateral support rod 118 to pivot the head restraint 116 between the use position and the folded position when the locking plate 130 is released from the latch 132. The biasing member 138 is adapted to be connected to the rear housing 122 of the head restraint 116 at a first distal end and to the latch 132 at a second distal end to bias the head restraint 116 in either the first direction indicated by the arrow $A_1$ or in the second direction indicated by the arrow $A_2$. In one embodiment, the biasing member 138 is a compression spring. In another embodiment, the biasing member 138 is a torsion spring. Of course, any suitable biasing member 138 is contemplated within the scope of the disclosed embodiments.

A damping mechanism 140 may be mounted within the head restraint 116. The damping mechanism 140 may include a pinion gear 142, which may be attached to the lateral support rod 118 and a damper 144, which may be attached to the head restraint 114. The damping mechanism 140 damps the movement of the head restraint assembly 114 when pivoting from the use position to the folded position thereby allowing such movement to proceed smoothly. Various damping mechanisms 140 may be provided having various damping characteristics in order to accommodate different head restraint assemblies 114.

In at least one embodiment, the damping mechanism 140 is mounted to the rear housing 122 and the biasing member 138 is mounted to the damping mechanism 140 at first distal end of the biasing member 138. The damping mechanism 140 connects the biasing member 138 to the rear housing 122. The damping mechanism 140 may dampen the force provided by the biasing member 138 to the head restraint assembly 114 in order to create a smooth movement while the head restraint assembly 114 pivots.

The head restraint assembly 110 may include one or more bushings 146 mounted between the head restraint 116 and the lateral support rod 118. The lateral support rod 118 may have a section positioned within one or more bushings 146 thereby allowing rotation of one or more bushings 146 about lateral support rod 118. The bushings 146 may be attached to the rear housing 122 as illustrated and/or the front housing 120. In some variations, bushings 146 are split bushings. In at least one embodiment, the bushings 146 are oil-impregnated bushings. Of course, any suitable bushings 146 and any suitable amount of bushings 146 may by utilized.

As depicted, the head restraint assembly 110 may include control members that are referred to as chuck clips 147 that mounted are under compression between the lateral support rod 118 and the rear housing 122. The chuck clips 147 press against the lateral support rod 118 in order to reduce vibration, thereby minimizing buzz, squeak and rattle (BSR). As illustrated, the chuck clips 147 may be provided proximate the bushings 146 to minimize BSR as the bushings 146 pivot about the lateral support rod 118. In one embodiment, the chuck clips 147 are made out of a spring steel material. Of course, any suitable chuck clips 147 are contemplated within the scope of the disclose embodiments.

The locking plate 130 may be pivoted in the direction $D_{10}$ by any number of mechanisms. As illustrated in FIG. 12, the head restraint assembly 114 may be folded via mechanical actuation. The head restraint assembly 114 includes a cable 148 attached to the locking plate 130 such that a second mechanical actuator 150 displaces the cable 148 to rotate the locking plate 130. In one embodiment, the second mechanical actuator 150 is a pull strap. A user can pull the pull strap 150 along the direction $D_{20}$, which displaces the cable 148 and rotates the locking plate 130. In another embodiment, the second mechanical actuator 150 is a switch. Of course, any suitable mechanical actuator 150 is contemplated within the scope of the present invention. The first mechanical actuator 128, discussed further below, may be utilized in combination with any suitable second mechanical actuator 150.

With reference now to FIG. 13, the locking plate 130 is illustrated in connection with the first mechanical actuator 128. In the illustrated embodiment, the first mechanical actuator is a push button actuator 128. The push button actuator 128 has a push button 152 that may be provided externally to the housing 122. The push button 152 may be depressed by a user in a direction $D_{30}$. The push button 152 is connected to a translating member 154 that is provided to translate when moved by the push button 152. The translating member 154 moves in the direction $D_{30}$ to move a pivoting member 156 to pivot and push on the locking plate 130 in a direction $D_{40}$, which rotates the locking plate 130 in the direction $D_{10}$ to disengage the locking plate 130 from the latch 132 so that the biasing member 138 moves the head restraint assembly 114 about the axis of rotation R. In at least one embodiment, the first mechanical actuator 128 is employed with the second mechanical actuator 150 so that the user could mechanically actuate the folding head restraint assembly 114 with the first mechanical actuator 128 or the second mechanical actuator 150.

In the depicted embodiment, the locking plate 130 can be pivoted with a motor 158. When activated, the motor 158 moves an armature 160 in a direction $D_{40}$ in order to pivot the locking plate 130 in the direction $D_{10}$ thereby moving the locking plate 130 from engagement with the slot 134 of the latch 132. In one embodiment, a user activates the motor 158 via a control signal carried thereto via wiring 162. In at least one refinement, a wireless receiver is used to generate this control signal.

The wiring 162 is provided within the hollow lateral support rod 118, which provides a clean exit point without turns and without pinching and/or rubbing of the wiring and/or cable against sharp edges. In another embodiment, the wiring 162 is cable connected to the locking plate 130 for mechanical actuation thereof. Of course, any suitable wiring and/or cable 162 may be provided within the hollow lateral support rod 118.

Figure 14:
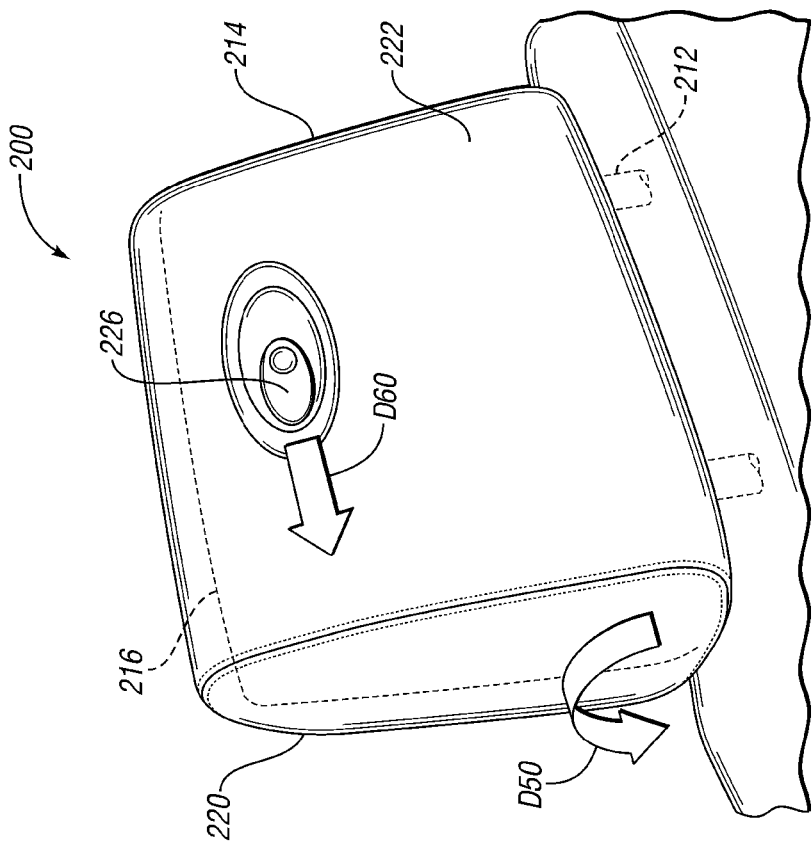
FIG. 14 is a perspective view showing an embodiment of a head restraint assembly in an upright position.

Referring now to FIG. 14, an alternate embodiment of head restraint assembly 200 is illustrated in an upright position to support the head of the occupant. The head restraint assembly 200 may be mounted on a mounting subassembly 212 such that the mounting subassembly 212 allows movement $D_{50}$ from the folded position to the upright position and vice versa. The head restraint 214 includes a housing 216 which may define an outer surface of the head restraint 214 and include cushioning and trim material.

In the upright position, the head restraint 214 may support and contact the head of the occupant along a front contact surface 220 which generally faces the front of the vehicle where the occupant is facing forward. It should be appreciated, that the head restraint 214 may be folded towards the front of the vehicle, or in other variations, folded toward the rear of the vehicle. As illustrated, the head restraint 214 may have a mechanical actuator 226 which extends beyond housing 216 and is mounted on the outer surface of the head restraint 214. In at least one embodiment, a mechanical actuator 226 is flush with an outer surface of the head restraint 214 which may be an outer surface of the cushioning and/or trim.

The mechanical actuator 226 may be a slide button actuator 226. The slide button actuator 226 may be actuated or slid by an occupant in a direction $D_{60}$ in order to fold the head restraint 214. The slide button 226 may be positioned on a rearward surface 222 of the head restraint. By providing the sliding button 226 along the rearward surface 222 of the head restraint 214, the mechanical actuator 226 may be located in the same location on the head restraint 214 regardless if the head restraint 214 is used on the drivers side or passenger side of the vehicle. For example, when the mechanical actuator 226 is located along the lateral sides of the head restraint, if the actuator is located along the outboard side on the driver side, the actuator will be on the inboard side when the head restraint is positioned on the passenger side of the vehicle. Conversely, if the same location for the actuator 226 is desired, unique headrest designs may be required for the both the drivers side and passenger side head restraints. Irrespective of where the slide button 226 is located along the outer surface of the head restraint 214, the slide button 226 may also be more compact than push button type actuators.

Figure 15:
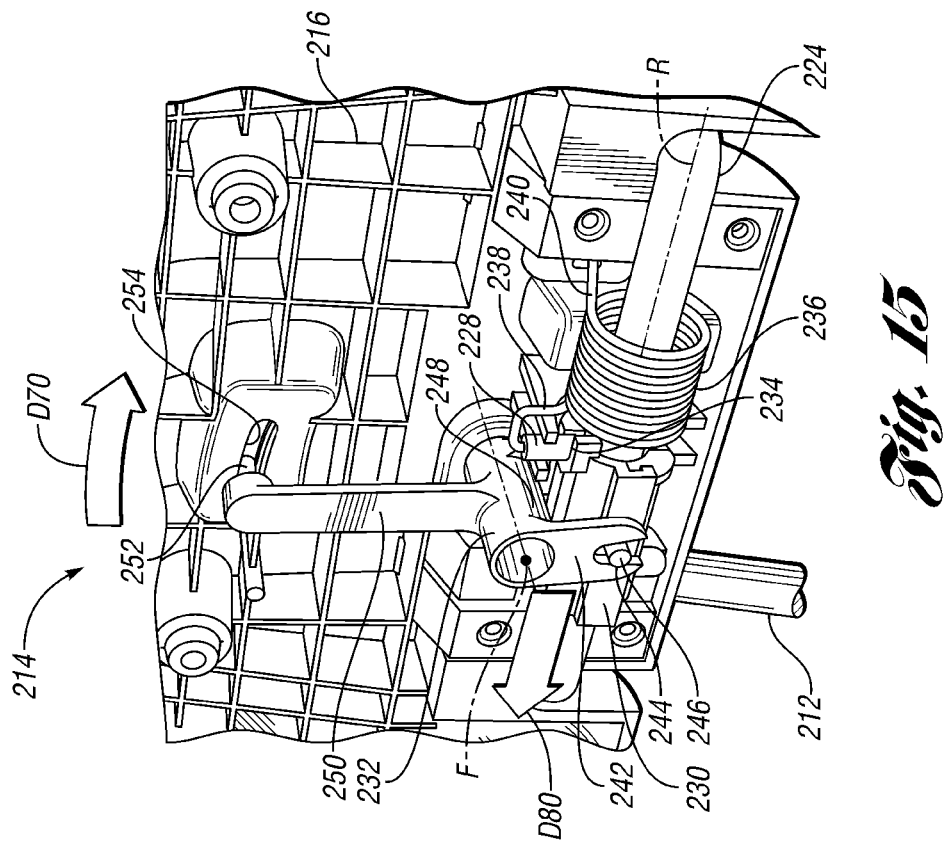
FIG. 15 is a schematic illustration of another embodiment of an interior of the head restraint assembly of FIG. 1 in a locked position.

Referring now to FIG. 15, the head restraint 214 is illustrated with a portion of the housing 216 removed in order to illustrate the interior of the head restraint 214. The head restraint 214 is depicted in the upright position. From the upright position, the head restraint 214 can pivot about the axis R to a folded position. The support subassembly 212 includes a cross member 224. As such, the axis R may be along the lateral axis of the cross member 224 so that the head restraint 214 pivots about the cross member 224.

The head restraint 214 may be retained in the upright position by a locking member 228 which retains a latch 230. As illustrated, the latch 230 may be a sliding latch 230 which is mounted to slide along the cross member 224. The locking member 228 may be a pin 228 mounted on the cross member 224 so that the pin 228 does not move relative to the cross member 224. The pin 228 may maintain contact with a slot or protrusion 234 formed in the latch 230. In at least one embodiment, a biasing member 236, shown as a spring, may bias the head restraint into the either the upright or folded position. The spring 236 may be connected at a first end 238 to the locking member 228 and at a second end 240 to the housing 216.

The head restraint 214 may include an actuator 232 to move the latch 230 out of engagement with the locking member 228. The actuator may include a lower actuator arm 242 which engages the latch 230. The lower actuator arm 242 may have a slot or protrusion 244 which may engage a corresponding aperture or protrusion 246 on the latch 230. The actuator 232 may include an upper actuator arm 250 which is connected to the sliding button 226. The actuator 232 may pivot about a shaft 248 connected to the housing 216 at a fixed point F. When the slide button 226 is actuated by an occupant, the upper actuator arm may move in a direction $D_{70}$, thereby moving the lower actuator arm 242 and the latch 230 in the direction $D_{80}$. When the latch 230 has been moved along the cross member 224 laterally in the direction $D_{80}$, the latch 230 is disengaged from the locking member 228. Once the latch 230 is disengaged from the locking member 228, the head restraint may pivot about the axis R.

The head restraint 214 may further include an elongated bar or connecting linkage 252 connecting the actuator 232 and the slide button 226. The connecting linkage 252 may be formed on the slide button 226 or the upper actuator arm 250, or may be a separate connecting linkage 252. The head restraint 214 may include a guide slot 254 through which the connecting linkage 252 extends. The guide slot 254 may be formed on the housing 216. As illustrated, the guide slot 254 may be formed as an arcuate aperture in order for the linkage 252 to accommodate pivotal movement of the actuator 232 while the sliding button 226 which slides in a linear direction $D_{60}$. In alternative embodiments, the guide slot 254 may be formed as a linear shaped aperture or any configuration which corresponds to the movement of the actuator 232 and the slide button 226.

Figure 16:
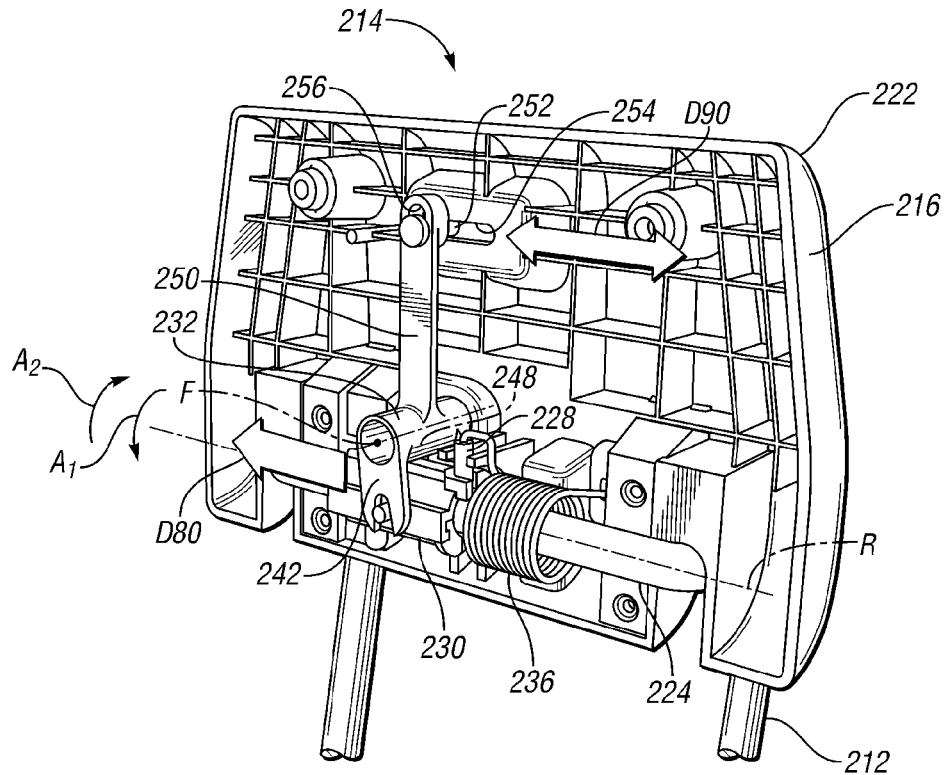
FIG. 16 is a schematic illustration of another embodiment of an interior of the head restraint assembly of FIG. 1 in a locked position.

Referring now to FIG. 16, FIG. 16 illustrates an embodiment where the slide button actuator 226 slides in the horizontal or lateral direction $D_{90}$. In this configuration, the guide slot 254 may also be generally horizontal. An additional guide opening 256 may be formed along the upper actuator arm 250. The connecting linkage 252 may extend through the guide slot 254 and be connected through the guide opening 256 so that the guide opening 256 accommodates the pivotal movement between the actuator 232 and the linear movement of the sliding button 226. When the slide button 226 is actuated by an occupant, the upper actuator arm 250 may move in a direction D$_{90}$, thereby pivoting the lower actuator arm 242 and the latch 230 in the direction D$_{80}$. When the latch 230 has been moved along the cross member 224 laterally in the direction D$_{80}$, the latch 230 is disengaged from the locking member 228. Once the latch 230 is disengaged from the locking member 228, the head restraint may pivot about the axis R.

Figure 17:
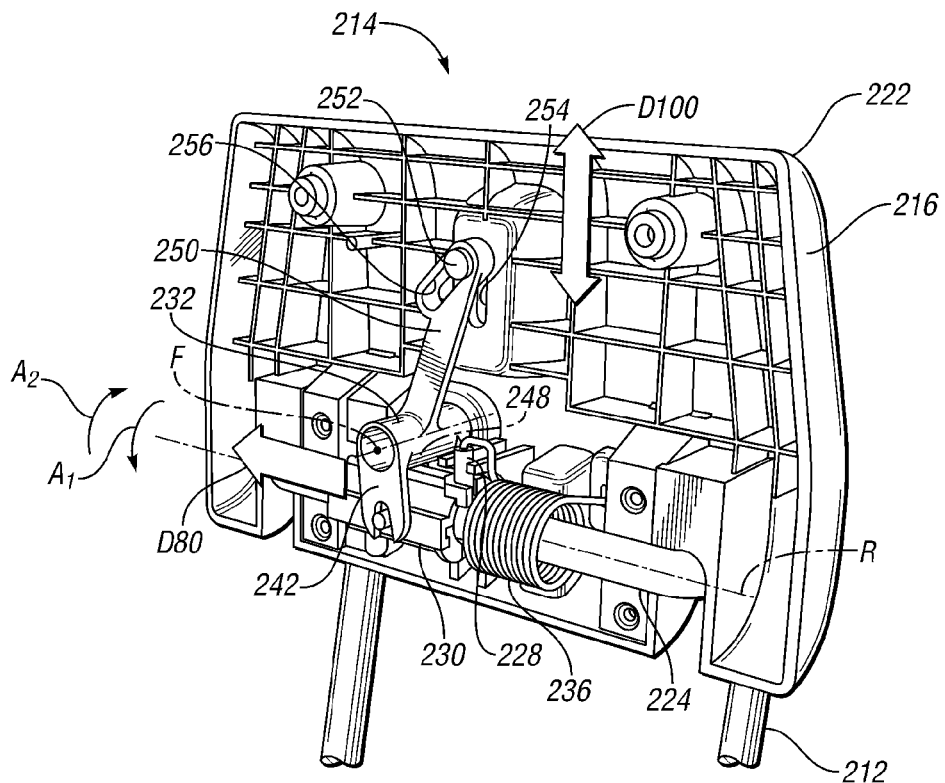
FIG. 17 is a schematic illustration of another embodiment of an interior of the head restraint assembly of FIG. 1 in a locked position.

FIG. 17 illustrates an alternate embodiment where the slide button actuator 226 may slide in the upright direction D$_{100}$. It is also contemplated that the slide button actuator 226 may also be configured to slide in a generally vertical or inclined direction or at an angle offset from horizontal. As illustrated in FIG. 17, the guide slot 254 may also be upright. An additional guide opening 256 may be formed along the upper actuator arm 250 where the guide opening 256 may be formed with an angle or formed as a horizontal opening. Alternatively, when the button 226 slides in the vertical direction, the guide slot 254 may be arcuate with a corresponding arc-shaped guide opening 256 in the upper actuator arm 250. The connecting linkage 252 may extend through the guide slot 254 and be connected through the guide opening 256 so that the guide opening 256 accommodates the pivotal movement between the actuator 232 and the linear movement of the sliding button 226. When the slide button 226 is actuated by an occupant, the upper actuator arm may move in a direction D$_{100}$, thereby moving the lower actuator arm 242 and the latch 230 in the direction D$_{80}$. When the latch 230 has been moved along the cross member 224 laterally in the direction D$_{80}$, the latch 230 is disengaged from the locking member 228. Once the latch 230 is disengaged from the locking member 228, the head restraint may pivot about the axis R.

Figure 18:
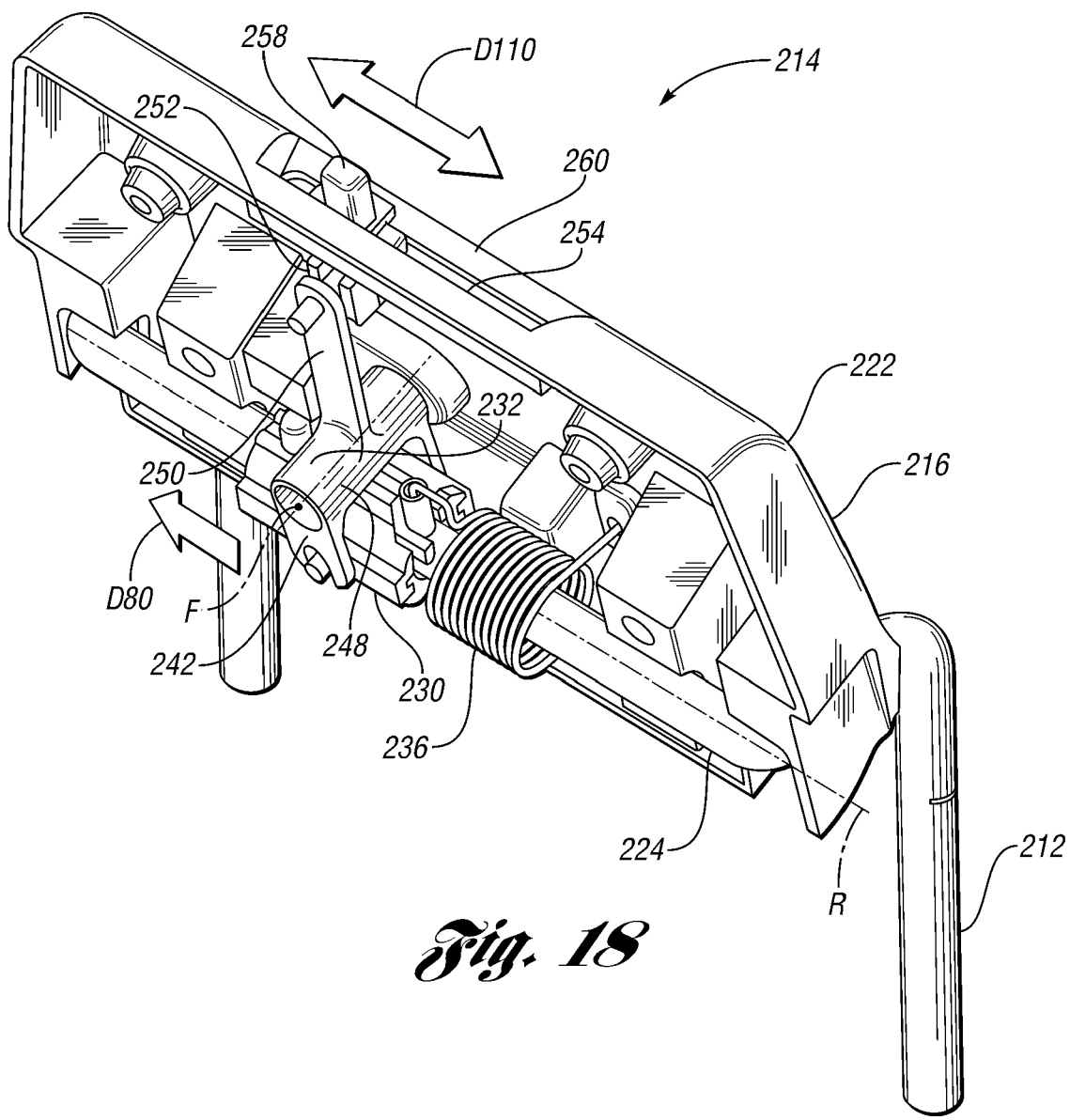
FIG. 18 is a schematic illustration of another embodiment of an interior of the head restraint assembly of FIG. 1 in a locked position.

FIG. 18 illustrates an alternate embodiment where the slide button actuator 226 may be an upright slider knob 258. As illustrated, the slider knob 258 may include a knob portion 258 that that extends in the upright direction, while the slider knob 258 slides in the horizontal or lateral direction D$_{110}$. In this configuration, the guide slot 254 may be formed in a horizontal recess 260 defined in the housing 216. When the slider knob 258 is actuated by an occupant, the upper actuator arm 250 may move in a direction D$_{110}$, thereby pivoting the lower actuator arm 242 and the latch 230 in the direction D$_{80}$. When the latch 230 has been moved along the cross member 224 laterally in the direction D$_{80}$, the latch 230 is disengaged from the locking member 228. Once the latch 230 is disengaged from the locking member 228, the head restraint may pivot about the axis R. In an alternative embodiment, the slider knob 258 may have a knob which extends rearward where the slider knob 258 slides in a generally vertical direction in a corresponding vertical recess 260 formed in the housing 216. It is also contemplated that the slider knob 258 may slide in any suitable direction and the housing 216 may be formed with a corresponding recess 260.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint assembly comprising:
a cross member adapted to be mounted within a vehicle;
a head restraint supported by the cross member;
a fixed locking member mounted within the head restraint;
a latch moveably mounted on the cross member at a first latch position engaged with the fixed locking member and at a second latch position released from the fixed locking member; and
an actuator provided proximate the latch to move the latch between the first latch position and the second latch position;
wherein the head restraint is pivotable about the cross member when the latch is in the second latch position, wherein the fixed locking member includes a pin mounted on the cross member,
wherein the latch has a release slot that allows movement of the latch relative to the pin such that when the latch is in the second latch position, the head restraint pivots about the cross member.

2. The head restraint assembly of claim 1 wherein the latch is mounted to slide on the cross member such that when the latch slides in a linear direction along the cross member, the latch moves from the first engaged latch position to the second released latched position.

3. The head restraint assembly of claim 1 further comprising a biasing member mounted to the head restraint and the latch to bias the latch to allow the latch to move relative to the pin.

4. The head restraint assembly of claim 1 wherein the release slot moves relative to the pin in a first direction as the latch moves along the cross member and the release slot moves relative to the pin in a second direction as the head restraint pivots about the cross member.

5. The head restraint assembly of claim 1 wherein movement of the actuator is initiated by displacing a cable in communication therewith.

6. The head restraint assembly of claim 1 wherein movement of the actuator is initiated by movement of a push rod.

7. The head restraint assembly of claim 1 wherein the actuator further comprises a push button provided externally to the head restraint such that pushing the push button translates the latch from the first latch position to the second latch position.

8. The head restraint assembly of claim 1 wherein the actuator further comprises a slide button mounted to an outer surface of the head restraint such that sliding the slide button slides the latch from the first latch position to the second latch position.

9. The head restraint assembly of claim 8 wherein the slide button is mounted on a rearward surface of the head restraint, opposite to a contact surface.

10. The head restraint assembly of claim 1 further comprising a motor connected to the actuator such that the motor moves the actuator to translate the latch from the first latch position to the second latch position.

11. The head restraint assembly of claim 1 further comprising a biasing member to move the head restraint from a first head restraint position to a second head restraint position when the latch is in the second latch position.

12. A head restraint assembly comprising:
a cross member adapted to be mount within a vehicle;
a head restraint supported by the cross member;
a locking member mounted within the head restraint;
a slide latch mounted to slide on the cross member to a first latch position engaged with the locking member and slide linearly in a lateral direction along the cross member to a second latch position released from the locking member; and an actuator arm pivotally supported by the head restraint, wherein pivoting of the actuator arm slides the latch between the first latch position and the second latch position;

wherein the head restraint is pivotable about the cross member when the latch is in the second latch position.

13. The head restraint assembly of claim 12 wherein the cross member further comprises at least one terminal end adapted to be mounted within the vehicle.

14. A head restraint assembly comprising:

a lateral cross member adapted to be mount within a vehicle;

a head restraint pivotally supported by the cross member, such that the head restraint pivots about a lateral axis of the cross member in order to move the head restraint between an upright position and a stowed position;

a locking member mounted within the head restraint;

a latch mounted on the cross member, the latch movable linearly between at least a first latch position where the latch is engaged with the locking member and a second latch position where the latch is released from the locking member; and a slide button actuator mounted on an outer surface of the head restraint, the slide button actuator being connected to the latch such that actuating the slide button actuator moves the latch to the second latch position and releases the latch from the locking member for permitting movement of the head restraint from the upright position to the stowed position, wherein the latch slides linearly in a lateral direction along the cross member.

15. The head restraint assembly of claim 14 wherein the slide button is mounted on a rearward surface of head restraint opposite a contact surface.

16. The head restraint assembly of claim 14 further comprising an actuator arm pivotally mounted within the head restraint and connecting the slide button actuator and the latch.

17. The head restraint assembly of claim 16 wherein the slide button actuator includes an elongated bar which engages an aperture formed in the actuator arm.

18. The head restraint assembly of claim 12 further comprising a slide button mounted on an outer surface of the head restraint and being connected to the actuator arm such that actuating the slide button actuator pivots the actuator arm thereby sliding the latch to the second latch position and releases the latch from the locking member for permitting movement of the head restraint.

19. The head restraint assembly of claim 12 further comprising a slide button mounted on an outer surface of the head restraint and being connected to the actuator arm, wherein the slide button slides in a direction parallel to the outer surface of the head restraint.

20. The head restraint assembly of claim 12 wherein the locking member includes a pin, and wherein the latch has a release slot that allows movement of the latch relative to the pin such that when the latch is in the second latch position, the head restraint pivots about the cross member.

* * * * *